United States Patent
Akiyama

(10) Patent No.: US 9,915,860 B2
(45) Date of Patent: Mar. 13, 2018

(54) WAVELENGTH CONVERSION ELEMENT, ILLUMINATION DEVICE, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/376,114

(22) Filed: Dec. 12, 2016

(65) Prior Publication Data

US 2017/0199451 A1 Jul. 13, 2017

(30) Foreign Application Priority Data

Jan. 7, 2016 (JP) .................................. 2016-001829

(51) Int. Cl.
G03B 21/20 (2006.01)
G02B 27/14 (2006.01)
G02B 26/00 (2006.01)

(52) U.S. Cl.
CPC ......... *G03B 21/204* (2013.01); *G02B 26/008* (2013.01); *G02B 27/141* (2013.01)

(58) Field of Classification Search
CPC .... G03B 21/28; G03B 21/204; G03B 21/208; G03B 21/2033; G03B 21/2066; H04N 9/3114; H04N 9/3158; H04N 9/3161; H04N 9/3164
See application file for complete search history.

(56) References Cited

U.S. PATENT DOCUMENTS

| | | | | |
|---|---|---|---|---|
| 9,644,803 B2* | 5/2017 | Kasugai | .................... | F21K 9/64 |
| 2011/0116253 A1 | 5/2011 | Sugiyama | | |
| 2011/0310363 A1 | 12/2011 | Kita | | |
| 2012/0242912 A1* | 9/2012 | Kitano | ................. | H04N 9/3111 |
| | | | | 348/759 |
| 2013/0250255 A1* | 9/2013 | Kurosaki | ................ | F21V 13/08 |
| | | | | 353/85 |
| 2015/0192848 A1* | 7/2015 | Okuno | ............... | G03B 21/2066 |
| | | | | 348/759 |
| 2015/0204514 A1* | 7/2015 | Cao | ....................... | G02B 26/008 |
| | | | | 353/20 |
| 2016/0077326 A1* | 3/2016 | Yamagishi | ........... | G02B 26/008 |
| | | | | 353/61 |

FOREIGN PATENT DOCUMENTS

| | | |
|---|---|---|
| JP | 2011-113779 A | 6/2011 |
| JP | 2011-154168 A | 8/2011 |
| JP | 2012-004009 A | 1/2012 |
| JP | 2013-178290 A | 9/2013 |

* cited by examiner

*Primary Examiner* — Sultan Chowdhury
(74) *Attorney, Agent, or Firm* — Oliff PLC

(57) ABSTRACT

The invention relates to a wavelength conversion element including: a base material including a light-reflecting surface; a dichroic film; and a wavelength conversion layer provided between the light-reflecting surface and the dichroic film. The dichroic film reflects portion of light in a wavelength band that the wavelength conversion layer absorbs, and has a reflectance distribution, with respect to the light along a predetermined direction.

15 Claims, 8 Drawing Sheets

WAVELENGTH CONVERSION ELEMENT, ILLUMINATION DEVICE, AND PROJECTOR

BACKGROUND

1. Technical Field

The present invention relates to a wavelength conversion element, an illumination device, and a projector.

2. Related Art

In recent years, as an illumination device used for a projector, a technique for producing white light by mixing fluorescence emitted from a phosphor that is excited by excitation light emitted from a solid-state light source and portion of the excitation light has been known (e.g., see JP-A2012-4009).

In the illumination device, however, although color balance can be adjusted before shipment of the product, color-balance deviation due to aging in use cannot be adjusted.

SUMMARY

An advantage of some aspects of the invention is to provide a wavelength conversion element, an illumination device, and a projector each capable of adjusting color balance.

A first aspect of the invention provides a wavelength conversion element including: a base material including a light-reflecting surface; a dichroic film; and a wavelength conversion layer provided between the light-reflecting surface and the dichroic film, the dichroic film reflecting portion of light in a wavelength band that the wavelength conversion layer absorbs and having a reflectance distribution with respect to the light along a predetermined direction.

Since the dichroic film, included in the wavelength conversion element according to the first aspect has the reflectance distribution along the predetermined direction, the amount of light reflected by the dichroic film can be adjusted by moving a region to be irradiated with the light. With this configuration, color balance of light including light emitted from the wavelength conversion layer and the light reflected by the dichroic film can be adjusted.

In the first aspect, it is preferable that a change in the reflectance distribution is continuous.

According to this configuration, the color balance can be accurately adjusted.

In the first aspect, it is preferable that a change in the reflectance distribution is discontinuous.

According to this configuration, since it is easy to manufacture the dichroic film, a reduction in cost can be achieved.

In the first aspect, it is preferable that a thickness of the dichroic film has a distribution along the predetermined direction.

According to this configuration, the dichroic film having the reflectance distribution along the predetermined direction can be realized.

In the first aspect, it is preferable that the wavelength conversion element further includes a diffusion section provided between the wavelength conversion layer and the dichroic film.

According to this configuration, since the light reflected by the dichroic film is scattered light, the illuminance distribution of the reflected light is close to the illuminance distribution of the light produced by the wavelength conversion layer compared with the case where the diffusion section is not provided. With this configuration, color unevenness of light produced from the light reflected by the dichroic film and the light produced by the wavelength conversion layer is reduced.

A second aspect of the invention provides an illumination device for emitting illumination light, the illumination device including: the wavelength conversion element according to the first aspect; a light-emitting element emitting excitation light in the wavelength band; and a drive device moving the base material, the dichroic film including a first region and a second region each having a different reflectance with respect to the excitation light, the drive device being configured to be able to move an incident position of the excitation light between the first region and the second region, the illumination light including a component of portion of the excitation light reflected by the dichroic film and fluorescence produced by the wavelength conversion layer.

According to the illumination device according to the second aspect, color balance of the illumination light can be simply and reliably adjusted by moving the base material with the drive device.

In the second aspect, it is preferable that the illumination device further includes: a detection section measuring a light amount of the illumination light; and a controller controlling the drive device based on a measurement result of the detection section.

According to this configuration, a change in the color balance of the illumination light can be made small.

In the second aspect, it is preferable that the illumination device further includes a rotation device rotating the base material around a predetermined center of rotation, that the wavelength conversion layer and the dichroic film are provided around the center of rotation, and that the predetermined direction is a radial direction of the base material.

According to this configuration, the color balance of the illumination light can be simply and reliably adjusted by moving the incident position of the excitation light in the radial direction of the base material.

A third aspect of the invention provides a projector including: the illumination device according to the second aspect; a light modulator modulating light from the illumination device in response to image information to thereby form image light; and a projection optical system projecting the image light.

Since the projector according to the third aspect includes the illumination device according to the second aspect, display with a small change in color balance can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
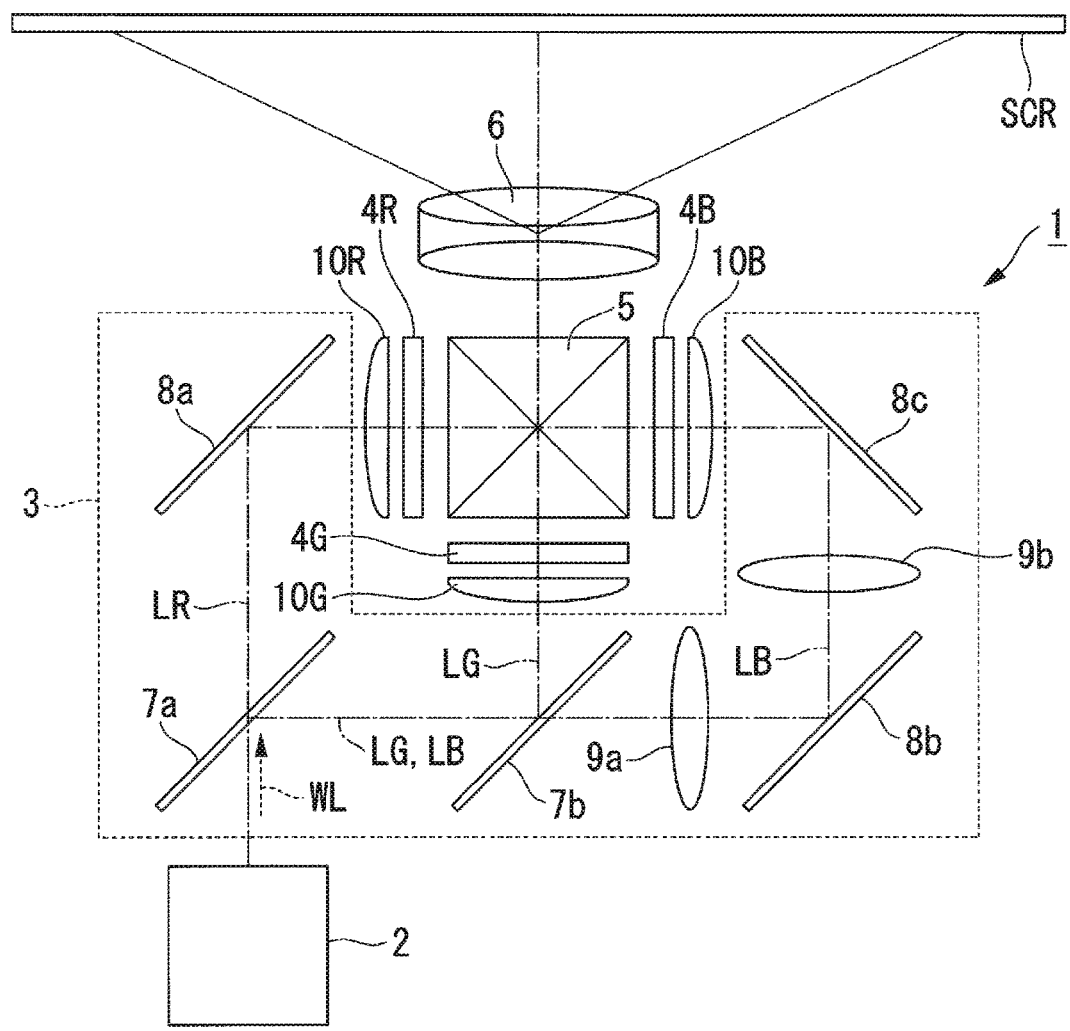
FIG. 1 is a schematic configuration diagram of a projector according to a first embodiment.

Hereinafter, embodiments of the invention will be described in detail with reference to the drawings.

In the drawings used in the following description, a characteristic portion may be shown in an enlarged manner for convenience sake to facilitate understanding thereof, and thus the dimension ratio and the like of each component are not always the same as actual ones.

First Embodiment

FIG. 1 is a schematic configuration diagram of a projector of a first embodiment.

As shown in FIG. 1, the projector 1 of the embodiment is a projection-type image display device that displays a color image on a screen SCR. The projector 1 uses three light modulators corresponding to respective colored lights; red light LR, green light LG, and blue light LB. The projector 1 uses, as a light source of an illumination device 2, a semiconductor laser from which high-luminance, high-output light is obtained.

The projector 1 roughly includes the illumination device 2, a color separation optical system 3, a light modulator 4R for red light, a light modulator 4G for green light, a light modulator 4B for blue light, a combining optical system 5, and a projection optical system 6.

The illumination device 2 emits white illumination light WL toward the color separation optical system. 3. A wavelength conversion element as one embodiment of the invention, to be described later, is used for the illumination device 2.

The color separation optical system 3 separates the illumination light WL emitted from the illumination device 2 into the red light LR, the green light LG, and the blue light LB. The color separation optical system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has the function of separating the illumination light WL emitted from the illumination device 2 into the red light LR, and the green light LG and the blue light LB. The first dichroic mirror a transmits the red light LR and reflects the green light LG and the blue light LB, The second dichroic mirror 7b has the function of separating the light reflected by the first dichroic mirror 7a into the green light LG and the blue light LB. The second dichroic mirror 7b reflects the green light LG and transmits the blue light LB.

The first reflection mirror 8a is disposed on the optical path of the red light LR. The first reflection mirror 8a reflects the red light LR transmitted through the first dichroic mirror 7a toward the light modulator 4R for red light. The second reflection mirror 8b and the third reflection mirror 8c are disposed on the optical path of the blue light LB. The second reflection mirror 8b and the third reflection mirror 8c reflect the blue light LB transmitted through the second dichroic mirror 7b toward the light modulator 4B for blue light. The green light LG is reflected by the second dichroic mirror 7b and then travels toward the light modulator 4G for green light.

The first relay lens 9a and the second relay lens 9b are disposed on the light-exiting side of the second dichroic mirror 7b on the optical path of the blue light LB. The first relay lens 9a and the second relay lens 9b have the function of compensating for light loss of the blue light LB due to the fact that the optical path length of the blue light LB is longer than the optical path length of the red light LR or the green light LG.

The light modulator 4R for red light modulates the red light LR in response to image information to form image light corresponding to the red light LR. The light modulator 4G for green light modulates the green light LG in response to image information to form image light corresponding to the green light LG. The light modulator 4B for blue light modulates the blue light LB in response to image information to form image light corresponding to the blue light LB.

For example, a transmissive liquid crystal panel is used for the light modulator 4R for red light, the light modulator 4G for green light, and the light modulator 4B for blue light. A pair of polarizers (not shown) are disposed on the incident and exiting sides of the liquid crystal panel. The polarizer transmits linearly polarized light in a specific direction.

A field lens 10R is disposed on the incident side of the light modulator 4R for red light. A field lens 10G is disposed on the incident side of the light modulator 4G for green light. A field lens 10B is disposed on the incident side of the light modulator 4B for blue light. The field lexis 10R collimates the red light LR to be incident on the light modulator 4R for red light. The field lens 10G collimates the green light LG to he incident on the light modulator 4G for green light. The field lens 10B colligates the blue light LB to be incident on the light modulator 4B for blue light.

The combining optical system 5 combines the image lights corresponding to the red light LR, the green light LG, and the blue light LB, and emits the combined image light toward the projection optical system 6. For example, a cross dichroic prism is used for the combining optical system 5.

The projection, optical system 6 is composed of a projection lens group including a plurality of projection lenses. The projection optical system 6 enlarges and projects the image light combined by the combining optical system 5 onto the screen SCR. With this configuration, an enlarged color image is displayed on the screen SCR.

Figure 2:
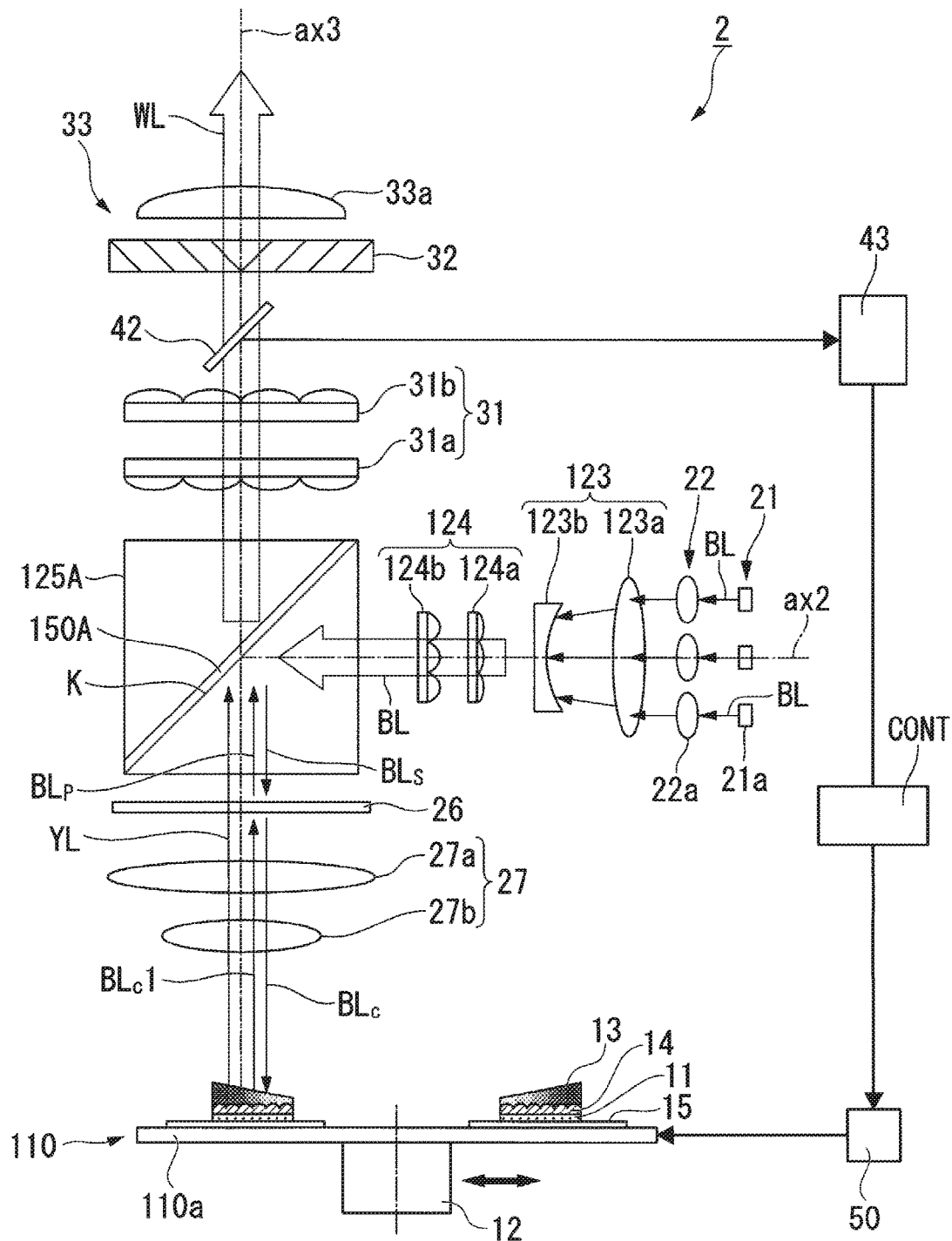
FIG. 2 is a diagram showing a schematic configuration of an illumination device.

Subsequently, the illumination device 2 will be described. FIG. 2 is a diagram showing a schematic configuration of the illumination device 2.

As shown in FIG. 2, the illumination device 2 includes an array light source 21, a collimator optical system 22, an afocal optical system 123, a homogenizer optical system 124, an optical element 125A including a polarization separation element 150A, a retardation film 26, a pickup optical system 27, an integrator optical system 31, a polarization conversion element 32, a superimposing optical system 33, a phosphor wheel 110, a light-amount monitoring mirror 42, a sensor unit (detection section) 43, a drive device 50, and a controller CONT. The phosphor wheel 110 corresponds to "wavelength conversion element" in the appended claims.

The array light source 21 includes a plurality of semiconductor lasers 21a that are arranged. Specifically, the array light source 21 is composed of the plurality of semiconductor lasers 21a arranged in an array in a plane orthogonal to the optical axis. The number of the semiconductor lasers 21a is not particularly limited. The semiconductor laser 21a emits, for example, blue excitation light BL.

The semiconductor laser corresponds to "light-emitting element" in the appended claims.

In the embodiment, the optical axis of the array light source 21 is defined as an optical axis ax2. The optical axis of light emitted from the phosphor wheel 110, to be described later, is defined as an optical axis ax3. The optical axis ax2 and the optical axis ax3 lie in the same plane and are orthogonal to each other.

The array light source 21, the collimator optical system 22, the afocal optical system 123, the homogenizer optical system 124, and the optical element 125A are aligned in this order on the optical axis ax2. On the other hand, the phosphor wheel 110, the pickup optical system 27, the retardation film 26, the optical element 125A, the integrator optical system 31, the polarization conversion element 32, and the superimposing optical system 33 are aligned in this order on the optical axis ax3.

In the embodiment, the polarization direction of the excitation light BL emitted by each of the semiconductor lasers 21a in the array light source 21 is made coincident with the polarization direction of the polarization component (e.g., S-polarization component) reflected by the polarization separation element 150A. The excitation light BL emitted from the array light source 21 is incident on the collimator optical system 22.

The collimator optical system 22 converts the excitation lights BL emitted from the array light source 21 to parallel light beams. The collimator optical system 22 is composed of, for example, a plurality of collimator lenses 22a arranged in an array. The plurality of collimator lenses 22a are disposed in one-to-one correspondence with the plurality of semiconductor lasers 21a.

The excitation lights BL transmitted through the collimator optical system 22 and thus converted to parallel lights are incident on the afocal optical system 123.

The afocal optical system 123 adjusts the size (spot diameter) of the excitation light BL, and is composed of, for example, two afocal lenses 123a and 123b. The excitation light BL transmitted through the afocal optical system 123 and thus adjusted in size is incident on the homogenizer optical system 124.

The homogenizer optical system 124 converts the light intensity distribution, of the excitation light BL into a uniform state (so-called top-hat distribution) in the region to be illuminated, and includes, for example, a pair of multi-lens arrays 124a and 124b. The excitation light BL emitted through the homogenizer optical system 124 is incident on the optical element 125A.

The optical element 125A includes, for example, a dichroic prism having wavelength selectivity. The dichroic prism includes an inclined surface K at an angle of 45° relative to the optical axis ax2. The inclined surface K is at an angle of 45° relative to the optical axis ax3. The polarization separation element 150A having wavelength selectivity is provided on the inclined surface K.

The polarization separation element 150A has a polarization separation function of separating the excitation light BL in a first wavelength band incident on the polarization separation element 150A into an S-polarization component and a P-polarization component relative to the polarization separation element 150A. The polarization separation element 150A reflects the S-polarization component of the excitation light BL and transmits the P-polarization component of the excitation light BL (blue light).

Moreover, the polarization separation element 150A has a color separation function of transmitting light (fluorescence YL) in a second wavelength band different from the first wavelength band, in the light incident on the polarization separation element 150A, irrespective of the polarization state. The optical element 125A is not limited to one having a prismatic shape such as a dichroic prism, but a dichroic mirror having a parallel-plate shape may be used.

Then, since the polarization direction of the excitation light BL incident on the polarization separation element 150A is coincident with the S-polarization component, the excitation light BL is reflected as S-polarized excitation light BLs toward the phosphor wheel 110.

The retardation film 26 includes a ¼-wave plate disposed on the optical path between the polarization separation element 150A and a phosphor layer 11 of the phosphor wheel 110. The S-polarized (linearly polarized) excitation light BLs incident on the retardation film 26 is converted to circularly polarized excitation light BLc, and then incident on the pickup optical system 27.

The pickup optical system 27 concentrates the excitation light BLc onto the phosphor layer 11, and is composed of, for example, a pickup lens 27a and a pickup lens 27b.

The phosphor wheel 110 of the embodiment is a so-called reflective rotating fluorescent plate.

Figure 3:
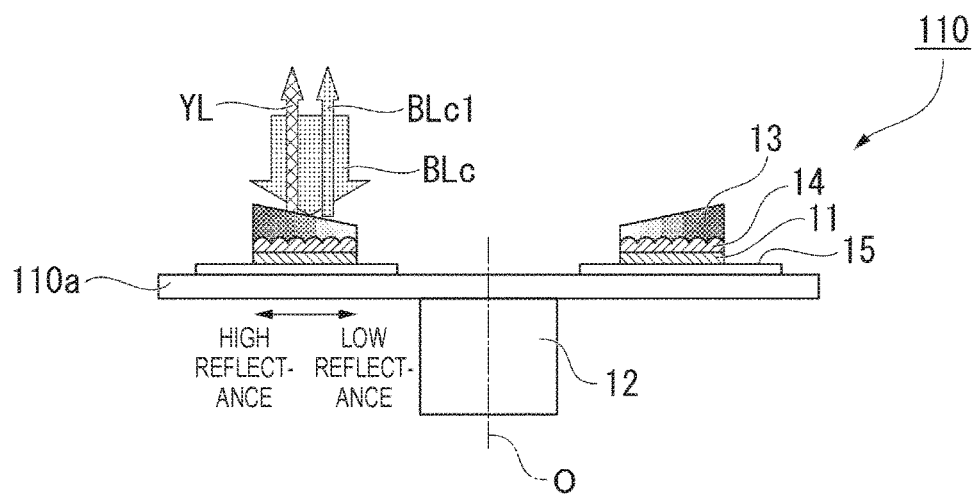
FIG. 3 is a cross-sectional view showing a configuration of a main portion of a phosphor wheel.
Figure 4:
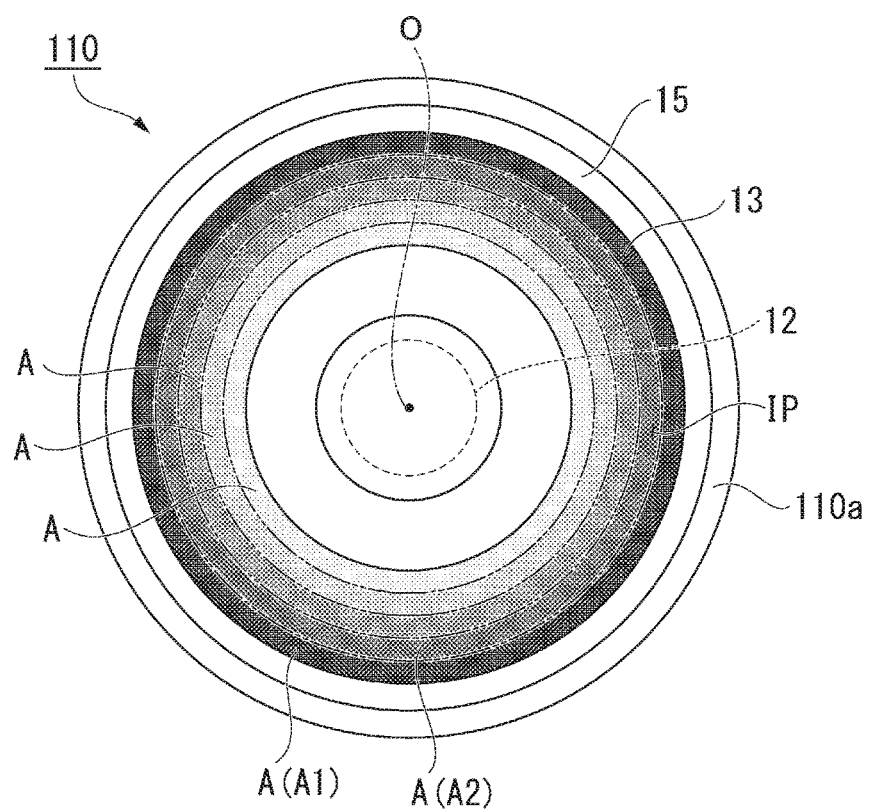
FIG. 4 is a top view showing the configuration of the main portion of the phosphor wheel.

FIG. 3 is a cross-sectional view showing a configuration of a main portion of the phosphor wheel 110. FIG. 4 is a top view showing the configuration of the main portion of the phosphor wheel 110.

As shown in FIGS. 3 and 4, the phosphor wheel 110 includes a rotating substrate 110a having a circular plate shape, a reflection film 15 provided on the rotating substrate 110a, the phosphor layer 11 provided on the reflection film 15, a microlens array 14 provided on the phosphor layer 11, a dichroic film 13 provided on the microlens array 14, and a motor 12 that rotates the rotating substrate 110a around an axis O of rotation passing through the center of the rotating substrate 110a. That is, the phosphor layer 11 is provided between the reflection film 15 and the dichroic film 13. The phosphor layer 11 is formed in a ring shape around the axis O of rotation. The lens surface of the microlens array 14 is provided on the dichroic film 13 side of the microlens array 14. Although the shape of the rotating substrate 110a is a circular plate in the embodiment, the shape of the rotating substrate 110a is not limited to the circular plate shape.

The rotating substrate 110a corresponds to "base material" in the appended claims. The reflection film 15 corresponds to "light-reflecting surface" in the appended claims. The phosphor layer 11 corresponds to "wavelength conversion element" in the appended claims. The motor 12 corresponds to "rotation device" in the appended claims. The axis O of rotation corresponds to "center of rotation" in the appended claims. The microlens array 14 corresponds to "diffusion section" in the appended claims. The first wavelength band corresponds to a wavelength band that the wavelength conversion layer absorbs.

The phosphor layer 11 includes a plurality of phosphor particles that emit fluorescence. For example, the phosphor particle contains a substance that emits the yellow fluorescence YL in response to excitation by the excitation light BLc (blue light) at a wavelength of approximately 450 nm.

As the phosphor particle, a generally known yttrium-aluminum-garnet (YAG) based phosphor can be used. The forming material of phosphor particles may be of one kind, or a mixture of particles formed using two or more kinds of forming materials may be used as phosphor particles.

The dichroic film 13 transmits the yellow fluorescence YL and reflects portion of the blue excitation light BLc. A component of the excitation light BLc that transmits through the dichroic film 13 is incident on the phosphor layer 11 and converted to the fluorescence YL.

In the embodiment, since the microlens array 14 is provided between the dichroic film 13 and the phosphor layer 11, the dichroic film 13 reflects the shape of the lens surface of the microlens array 14 to some extent. Therefore, a component of the excitation light BLc that is reflected by the dichroic film 13 is scattered light. The scattered light is referred to as "scattered reflected light BLcs". The scattered reflected light BLcs is incident oh the pickup optical system 27.

The fluorescence YL produced by the phosphor layer 11 is emitted from the phosphor layer 11 toward the pickup optical system 27 directly or after reflection by the reflection film 15.

Hereinafter, a component of the excitation light BLc that is not converted to the fluorescence YL is referred to as "excitation light BLcr". The excitation light BLcr is reflected by the reflection film 15, diffused by the microlens array 14, and then transmits through the dichroic film 13. The excitation light BLcr transmitted through the dichroic film 13 is combined with the scattered reflected light BLcs and thus forms blue light BLc1 to be incident on the pickup optical system 27, The blue light BLc1 passes again through the retardation film 26 to thereby be converted to blue light BLp to be incident as P-polarized light on the polarization separation element 150A.

The rotating substrate 110 a rotates at a predetermined number of revolutions in the use of the projector 1. This prevents the excitation light BLc from being continuously incident oh a specific region of the phosphor layer 11, and therefore, longer life of the phosphor layer 11 is achieved.

The fluorescence (yellow light) YL emitted from the phosphor layer 11 toward the polarization separation element 150A passes through the pickup optical system 27 and the retardation film 26. The fluorescence YL is unpolarized light; therefore, after passing through the retardation film 26, the fluorescence YL is incident on the polarization separation element 150A while remaining unpolarized. Then, the fluorescence YL transmits through the polarization separation element 150A.

The blue light BLp and the yellow fluorescence YL that are transmitted through the polarization separation element 150A are mixed together, so that the illumination light (white light) WL is obtained. After transmitting through the polarization separation element 150A, the illumination light WL is incident on the integrator optical system 31.

The illuminance distribution of the scattered reflected light BLcs is close to the illuminance distribution of the fluorescence YL due to the effect of the microlens array 14. The excitation light BLcr is also scattered by the microlens array 14. This reduces color unevenness of the illumination light WL produced from the blue light BLc1 (blue light BLp) and the fluorescence YL.

The integrator optical system 31 divides the illumination light WL into a plurality of small light beams. The integrator optical system 31 is composed of, for example, a first lens array 31a and a second lens array 31b. The first lens array 31a and the second lens array 31b each include a plurality of lenses arranged in an array.

The illumination light WL emitted through the integrator optical system 31 is incident on the polarization conversion element 32. The polarization conversion element 32 aligns the polarization direction of the illumination light WL. The polarization conversion element 32 is composed of, for example, a polarization separation film, a retardation film, and a mirror. For aligning the polarization direction of the fluorescence YL as unpolarized light with the polarization direction of the blue light BLc1, the polarization conversion element 32 converts one of the polarization components to the other polarization component, for example, converts the P-polarization component to the S-polarization component.

The light-amount monitoring mirror 42 is provided on the optical path between the integrator optical system 31 and the polarization conversion element 32. The light-amount monitoring mirror 42 is a half-mirror and disposed at an angle of 45° relative to the optical axis ax3. The light-amount monitoring mirror 42 transmits portion of incident light and reflects the remaining portion thereof. The light transmitted through the light-amount monitoring mirror 42 is incident on the polarization conversion element 32, while the light reflected by the light-amount monitoring mirror 42 is incident on the sensor unit 43.

Figure 5:
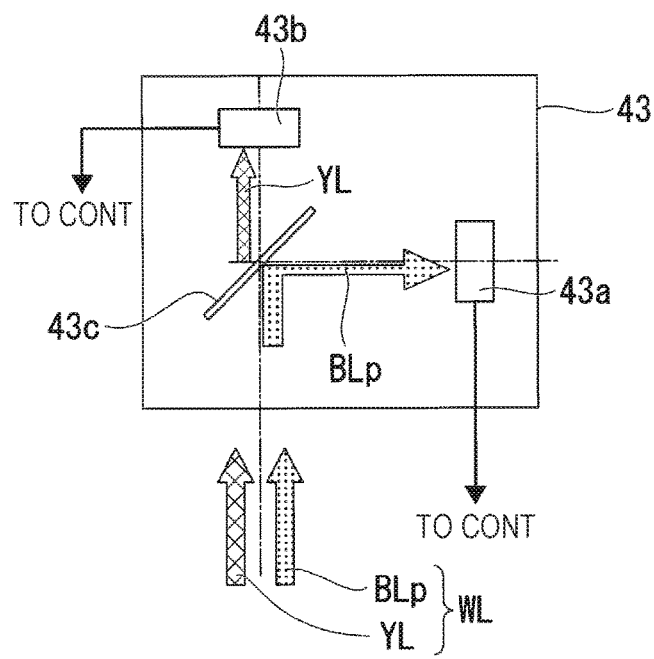
FIG. 5 is a diagram showing a schematic configuration of a sensor unit.
Figure 6:
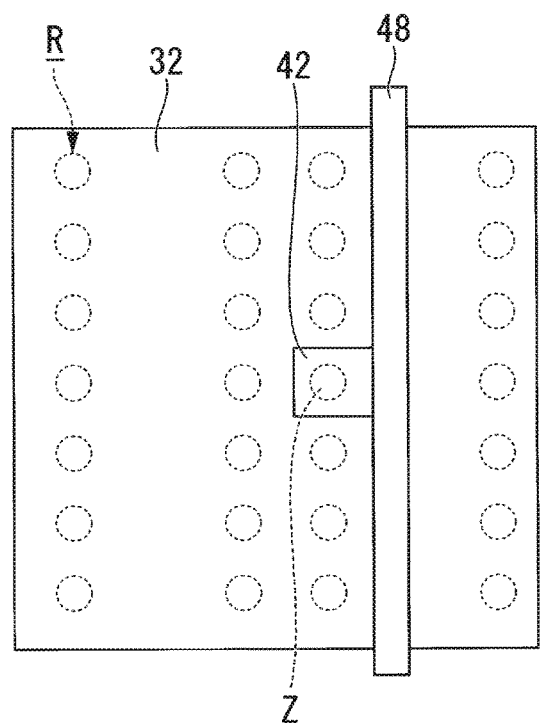
FIG. 6 is an elevation view showing the arrangement of a mirror in a polarization conversion element.

FIG. 5 is a diagram showing a schematic configuration of the sensor unit 43. FIG. 6 is an elevation view showing the arrangement of the mirror in the polarization conversion element.

As shown in FIG. 5, the sensor unit 43 includes a first sensor 43a, a second sensor 43b, and a dichroic mirror 43c. The dichroic mirror 43c is composed of a dielectric multilayer film, and has optical characteristics such that the dichroic mirror 43c transmits the fluorescence YL of the illumination light WL and reflects the blue light BLp of the illumination light WL.

The first sensor 43a measures the light amount of the blue light BLp, which has been reflected by the dichroic mirror 43c, out of the illumination light WL reflected by the light-amount monitoring mirror 42. The second sensor 43b measures the light amount of the fluorescence YL, which has transmitted through the dichroic mirror 43c, out of the illumination light WL reflected by the light-amount monitoring mirror 42. The first sensor 43a and the second sensor 43b transmit measurement results to the controller CONT. The controller CONT controls, based on the measurement results of the first sensor 43a and the second sensor 43b, the movement of the phosphor wheel 110 as will be described later.

As shown in FIG. 6, the light-amount monitoring mirror 42 is held by a holding member 48 disposed to avoid light-incident regions R of the polarization conversion element 32. The light-incident region R of the polarization conversion element 32 is a region on which each of the plurality of small light beams emitted through the integrator optical system 31 is incident.

Since the second lens array 31b and the array light source 21 are in conjugate relationship with each other, a secondary light source image Z of the excitation light BL is formed on each of the plurality of lenses included in the second lens array 31b. The light-amount monitoring mirror 42 is disposed such that one secondary light source image Z of the plurality of secondary light source images Z formed on the second lens array 31b is incident on the light-amount monitoring mirror 42. Therefore, illuminance unevenness does not occur on the light modulator 4R for red light, the light modulator 4G for green light, and the light modulator 4B for blue light as the regions to be illuminated. Hence, if a reduction in illuminance corresponding to one secondary light source image can be-allowed, the light-amount monitoring mirror 42 may not be a half-mirror.

Herein, an example in which the light-amount monitoring mirror 42 is disposed on the optical path between the integrator optical system 31 and the polarization conversion element 32 has been shown. Instead of this example, the light-amount monitoring mirror 42 may be disposed on the optical path between the polarization conversion element 32 and a superimposing lens 33a.

The illumination light WL transmitted through the polarization conversion element 32 is incident on the superimposing lens 33a. The superimposing lens 33a superimposes the plurality of small light beams emitted through the polarization conversion element 32 on each other on the object to be illuminated. With this configuration, the object to be illuminated can be uniformly illuminated. The superimposing optical system 33 is composed of the integrator optical system 31 including the first lens array 31a and the second lens array 31b, and the superimposing lens 33a.

The phosphor wheel 110 will be described in detail.

For convenience of description, it is assumed, as shown in FIG. 4, that the dichroic film 13 provided on the phosphor layer 11 is composed of a plurality of regions A having a ring shape centered on the axis O of rotation of the rotating substrate 110a. The plurality of regions A includes a first region A1 and a second region A2. Since the phosphor wheel 110 is rot at ably driven by the motor 12, an incident position IP of the excitation light BLc on the dichroic film 13 traces a circle around the axis O of rotation of the rotating substrate 110a.

In the embodiment, the dichroic film 13 has a reflectance distribution with respect to the excitation light BLc along a predetermined direction. Specifically, the direction of the reflectance distribution coincides with the radial direction of the rotating substrate 110a. The direction of the reflectance distribution is a direction in which a gradient in the reflectance is maximum.

In the dichroic film 13, the reflectance on the inner circumferential side of the rotating substrate 110a is lower than the reflectance on the outer circumferential side. Specifically, the reflectance distribution continuously changes such that the reflectance becomes higher from the inner circumferential side toward the outer circumferential side of the rotating substrate 110a.

In the embodiment, the above reflectance distribution of the dichroic film 13 is realized by gradually increasing the thickness thereof from the inner circumferential side toward the outer circumferential side of the rotating substrate 110a as shown in FIG. 3. The reason is as follows: generally, increasing the thickness of the dichroic film 13 increases the probability of the excitation light being reflected within the film, resulting in an increase in reflectance; in contrast, reducing the thickness of the dichroic film 13 reduces the probability of the excitation light being reflected within the film, resulting in a relative decrease in reflectance.

In the embodiment, the drive device 50 can translate the phosphor wheel 110 in a direction crossing the optical axis ax3. The drive device 50 is controlled by the controller CONT. The controller CONT drives the drive device 50 based on the results transmitted from the sensor unit 43 (the first sensor 43a and the second sensor 43b) as described above. Then, the drive device 50 translates the phosphor wheel 110 in a predetermined direction.

The drive device 50 translates the phosphor wheel 110 so as to change the reflectance of the dichroic film 13 at the incident position IP of the excitation light BLc.

Here, it is assumed that the incident position IP at a certain time is located in the first region A1. Moreover, it is assumed that after the drive device 50 translates the phosphor wheel 110 in the predetermined direction, the incident position IP is located in the second region A2. In FIG. 4, the incident position IP is located in the second region A2. The reflectance of the dichroic film 13 in the first region A1 is higher than the reflectance of the dichroic film 13 in the second region A2.

Here, consider the case where the amount of light emitted from the semiconductor laser 21a is lowered due to aging in the use of the projector. The concept of a countermeasure of the embodiment against color-balance deviation occurring in this case will be described based on a flowchart in FIG. 7.

As the output of the semiconductor laser 21a is lowered (Step S1 in FIG. 7), the light amount of the excitation light BL to excite the phosphor layer 11 is lowered. The lowering of the light amount of the excitation light BL is equivalent to the lowering of the light density (light amount per unit area) of the excitation light BL (Step S2 in FIG. 7). The phosphor layer 11 generally has characteristics such that conversion efficiency in converting the excitation light to fluorescent light increases as the light density of incident excitation light is lowered. Hence, even if the light amount of the excitation light BL is lowered, the light amount of the fluorescence YL emitted from the phosphor layer 11 increases when the increase rate of the fluorescence YL due to the increase in conversion efficiency exceeds the decrease rate of the fluorescence YL due to the lowering of the light amount of the excitation light BL (Step S3 in FIG. 7). Herein, the case where the light amount of the fluorescence YL increases is described by way of example, but the light amount of the fluorescence YL may decrease in some cases. In any case, however, color balance is lost.

Here, the light amounts of the excitation light BLc and the blue light BLp are both lowered along with the lowering of output of the semiconductor laser 21a. However, since the conversion efficiency of the phosphor layer 11 increases, the light amount of the fluorescence YL to the blue light BLp relatively increases (Step S4 in FIG. 7). As a result, the ratio between the blue light BLp and the yellow fluorescence YL changes, and thus the color balance of the illumination light WL is lost relative to that before aging (Step S5 in FIG. 7). Specifically, since the light amount of the yellow fluorescence YL to the light amount of the blue light BLp relatively increases, the illumination light WL changes to yellowish white light.

Figure 7:
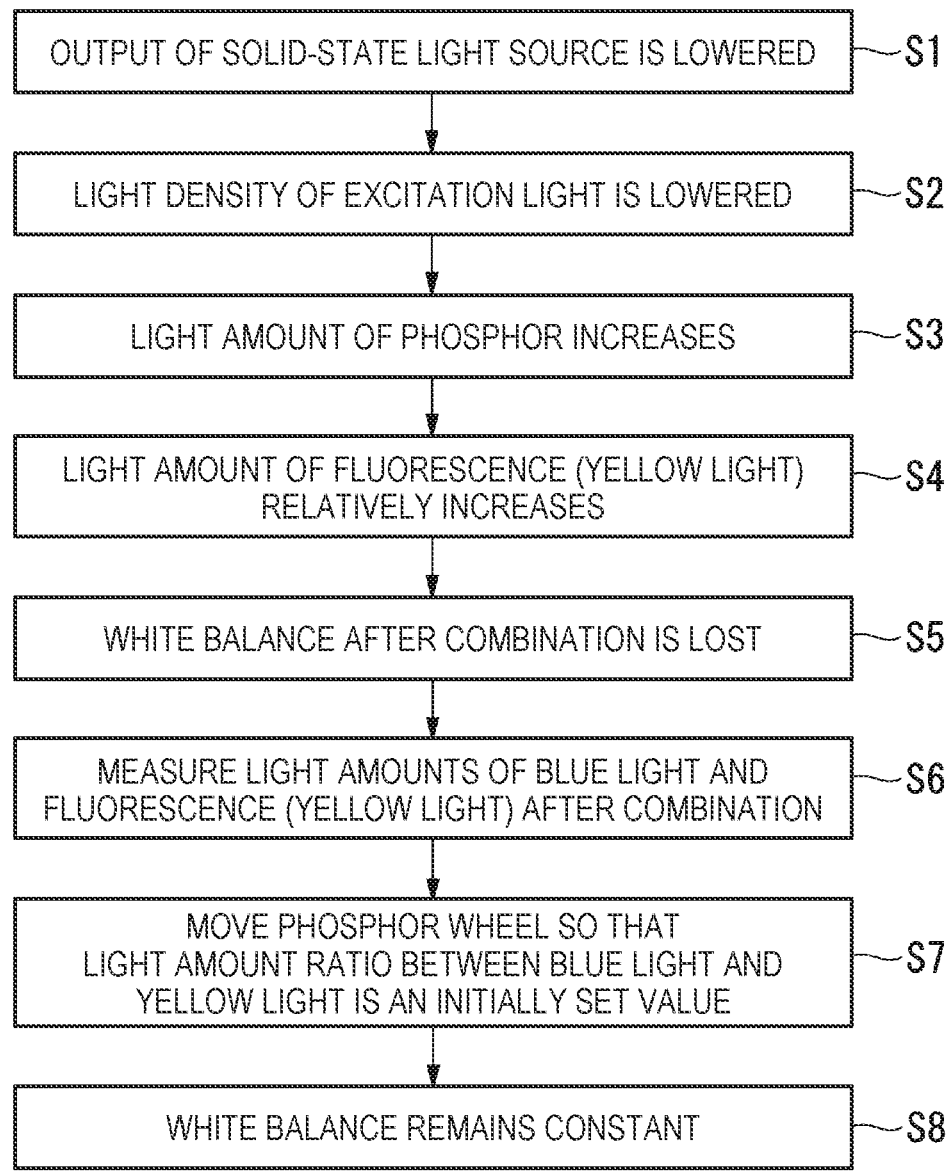
FIG. 7 is a flowchart showing the concept of adjustment of color balance.

In the embodiment, the light amount (intensity) of the blue light BLp and the light amount (intensity) of the yellow fluorescence YL, which are included in the light extracted from the light-amount monitoring mirror 42, are measured by the sensor unit 43 (Step S6 in FIG. 7). The measurement results of the sensor unit 43 are transmitted to the controller CONT.

The controller CONT stores, as a reference value, the ratio (intensity ratio) between a blue light intensity and a yellow light intensity that is determined based on the initial intensity values at the time of beginning of use of the projector 1. The controller CONT compares a current intensity ratio detected toy the sensor unit 43 with the reference value. When the difference between the current intensity ratio and the reference value exceeds the allowable range, the drive device 50 translates the phosphor wheel 110 to move the incident position of the excitation light BLc to another region of the dichroic film 13 that has a different reflectance so that the intensity ratio is close to the reference value (Step S7 in FIG. 7). For example, the drive device 50 moves the incident position of the excitation light BLc between the first region A1 and the second region A2.

By changing the reflectance at the incident position of the excitation light BLc as described above, the ratio between the light amounts of the fluorescence YL and the blue light BLp that constitute the illumination light WL can be adjusted.

Specifically, for increasing the light amount of the blue light BLp while reducing the light amount of the fluorescence YL as yellow light, the amount of the excitation light BLcs reflected by the dichroic film 13 is to be increased. That is, the phosphor wheel 110 is translated such that the excitation light BLc is incident on a portion of the dichroic film 13 that has a different thickness, for example, on a thick portion.

This increases the amount of the blue light BLcs reflected by the dichroic film 13 and thus reduces the amount of the fluorescence YL emitted from the phosphor layer 11, resulting in a relative increase in the amount of the blue light BLp. This makes the illumination light WL more whitish compared with that when the color balance of white light is lost, so that the color balance can be improved (Step S8 in FIG. 7).

On the other hand, for reducing the light amount of the blue light BLp while increasing the light amount of the fluorescence YL as yellow light, the amount of the excitation light BLcs reflected by the dichroic film 13 is to he reduced. That is, the phosphor wheel 110 is translated such that the excitation light BL is incident on a portion of the dichroic film 13 that has a different thickness, for example, on a thin portion.

This reduces the amount of the blue light BLcs reflected by the dichroic film 13 and thus increases the amount of the fluorescence YL emitted from the phosphor layer 11, resulting in a relative decrease in the amount of the blue light BLp. This makes the illumination light WL more whitish compared with that when the color balance of white light is lost, so that the color balance can be improved (Step S8 in FIG. 7).

In the above description, the phosphor wheel 110 is translated such that the excitation light BLc is incident on the portion where the thickness of the dichroic film 13 is thick, so that the light amount of the blue light BLp is increased while the light amount of the fluorescence YL is reduced. However, the phosphor layer 11 has characteristics such that the conversion efficiency increases as the light density of incident excitation light is lowered, as has been already described. Therefore, the amount of the fluorescence YL does not always decrease by an amount corresponding to the reduced amount of the excitation light incident on the phosphor layer 11. Moreover, depending on the design of the dichroic film 13, it is not always true that the thicker the dichroic film 13 is, the higher the reflectance is.

Hence, the amount of change in the thickness of a region of the dichroic film 13 on which the excitation light BLc is incident and the direction of the change may be set according to the design of the dichroic film 13 or the light density of excitation light currently incident on the phosphor layer 11.

As the timing of adjusting the color balance, measurements of the blue light intensity and the yellow light intensity and the translation of the phosphor wheel 110 are desirably set to be performed, for example, immediately after turning on the main power of the projector 1. The reason for that is that the configuration in which the adjustment is performed immediately after turning on the main power of the projector 1 makes it hard for the user to recognize a color change in image. However, if the adjustment of the color balance is performed only immediately after turning on the main power of the projector 1, color-balance deviation in the use of the projector 1 cannot be dealt with. Hence, a configuration in which the adjustment of the color balance is performed at a predetermined time interval even in the use of the projector 1 may be employed.

According to the phosphor wheel 110 of the embodiment as has been described above, since the dichroic film 13 having the reflectance distribution in the predetermined direction is included, the color balance of the illumination light WL including the fluorescence YL and the blue light BLp can be adjusted by changing the incident position of the excitation light BLc. Moreover, since a change in the reflectance distribution is continuous in the dichroic film 13, the above-described adjustment of the color balance can be accurately performed.

Moreover, according to the illumination device 2 of the embodiment, since the reflectance distribution occurs in the radial direction of the rotating substrate 110a, the color balance of the illumination light WL can be simply and reliably adjusted by moving the incident position of the excitation light BLc in the radial direction.

Moreover, a change in color balance can be made small by controlling the incident position of the excitation light BL on the dichroic film 13 based on the blue light intensity and the yellow light intensity measured by the sensor unit 43.

Moreover, since the measurement is performed by extracting a portion of the plurality of secondary light source images with the light-amount monitoring mirror 42, the adjustment of the color balance can be accurately performed without causing illuminance unevenness on the light modulator 4R for red light, the light modulator 4G for green light, and the light modulator 4B for blue light.

Moreover, according to the projector 1 of the embodiment, since the illumination device 2 is included, display with a small change in color balance can be performed.

Second Embodiment

In the above embodiment, the dichroic film 13 in which the reflectance distribution continuously changes from the inner circumferential side toward the outer circumferential side of the rotating substrate 110a has been exemplified. However, the invention is not limited to this, and a change in reflectance distribution may be discontinuous in the dichroic film.

Figure 8:
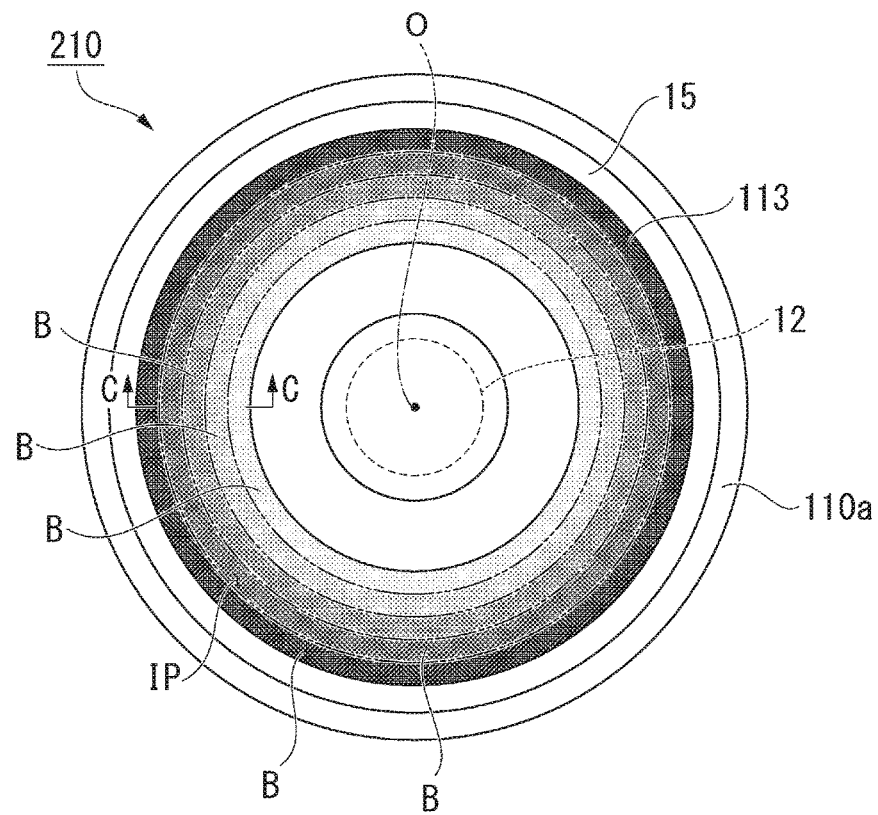
FIG. 8 is a diagram showing a configuration of a dichroic film according to a second embodiment.
Figure 9:
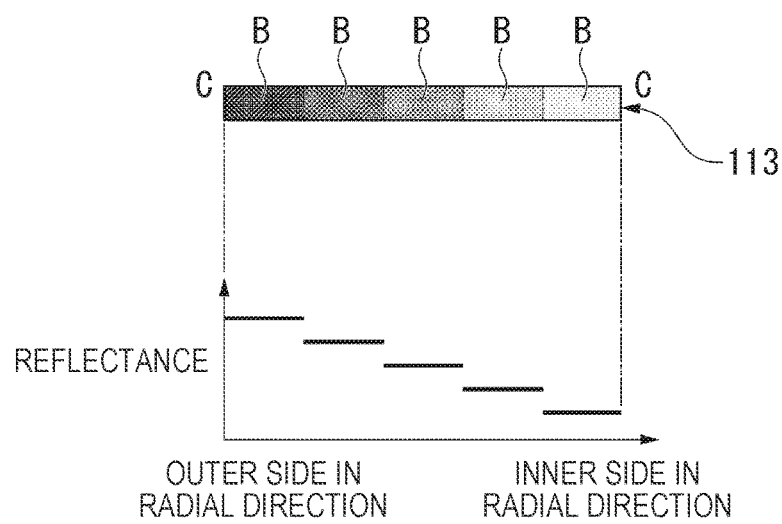
FIG. 9 is a cross-sectional view taken along line A-A in FIG. 8.

FIG. 8 is a diagram showing a configuration of a phosphor wheel 210 according to a second embodiment. FIG. 9 is a cross-sectional view taken along line C-C in FIG. 8. In FIGS. 8 and 9, members common to the above embodiment are denoted by the same reference numerals and signs.

As shown in FIG. 8, a dichroic film 113 in the phosphor wheel 210 includes a plurality of regions B having a ring shape centered on the axis O of rotation of the rotating substrate 110a.

The reflectance is constant in each of the regions B, but the reflectance is different in each of the regions B. The reflectance of the region B located on the outer circumferential side is higher than the reflectance of the region B located on the inner circumferential side. That is, as shown in FIG. 9, a change in reflectance is discontinuous in the dichroic film 113.

When the reflectance discontinuously changes as described above, it is easy to manufacture the dichroic film compared with the configuration of the first embodiment in which the reflectance continuously changes, and thus the cost can be cut down. The film thicknesses of the regions B in the dichroic film 113 shown in FIG. 9 are the same as each other. However, the invention is not limited to this, and the film thickness may be varied in each of the regions B to thereby obtain respective reflectances.

Figure 10:
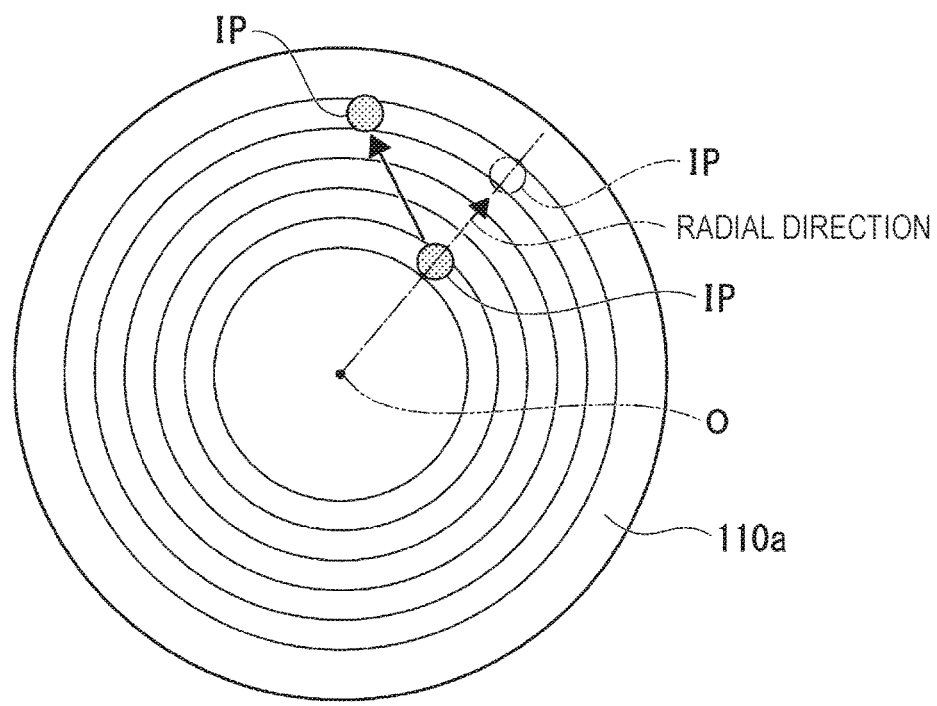
FIG. 10 is an explanatory view of a moving direction of an incident position of excitation light according to the second embodiment.

In the first embodiment, the incident position IP of the excitation light is moved along the radial direction of the rotating substrate 110a as shown by the dash-dotted line in FIG. 10. In the embodiment, however, the incident position IP is moved as shown by the solid line in FIG. 10. In short, the distance between the incident position IP and the axis O of rotation passing through the center of the rotating substrate 110a is to be changed. This is because since the dichroic film 13 has the reflectance distribution along the radial direction of the rotating substrate 110a, the reflectance of the dichroic film 13 at the incident position IP changes with a change in the distance between the incident position IP and the axis O of rotation. In FIG. 10, the spot diameter of the excitation light at the incident position IP is shown enlarged for clarity of illustration.

Third Embodiment

In the above embodiment, the case of using the phosphor wheel 110 has been exemplified. However, the illumination device 2 is not limited to this configuration. For example, the phosphor layer may be provided on a non-rotatable base material.

Figure 11:
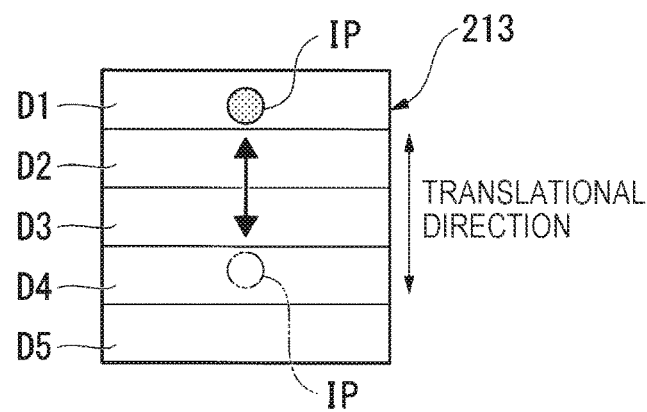
FIG. 11 is a diagram showing a configuration of a dichroic film according to a third embodiment.

FIG. 11 is a diagram showing a configuration of a dichroic film 213 according to a third embodiment. Although illustration is omitted in FIG. 11, the dichroic film 213 is formed on the phosphor layer provided on a non-rotatable base material. In FIG. 11, the spot diameter of the excitation light at the incident position IP is shown enlarged for clarity of illustration.

As shown in FIG. 11, the dichroic film 213 includes, in this order regions D1, D2, D3, D4, and D5 having different reflectances along a direction in which the incident position IP of the excitation light on the dichroic film 213 moves, that is, along the translational direction of the dichroic film 213 (base material). For example, the reflectance of the region D1 is highest; the reflectance of the region D5 is lowest; and the reflectances of the regions D2 to D4 interposed between the region D1 and the region D5 are successively lowered.

Fourth Embodiment

Figure 12:
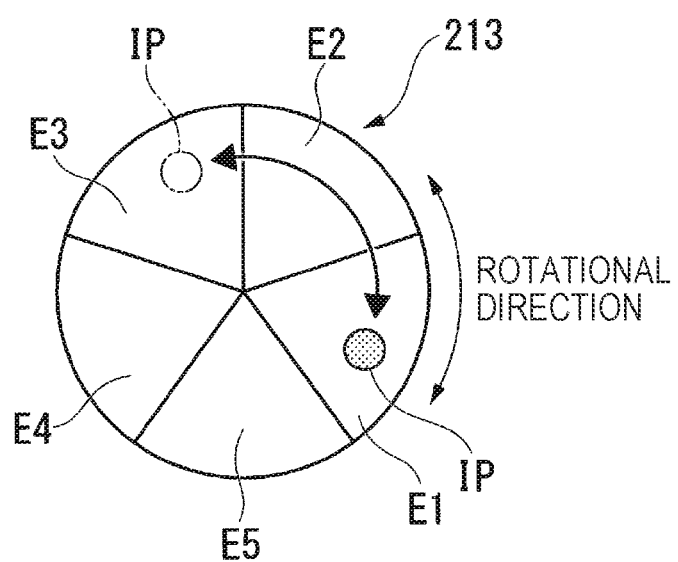
FIG. 12 is a diagram showing a configuration of a dichroic film according to a fourth embodiment.

In the first to third embodiments, the case where the incident position IP of the excitation light is changed by translating the dichroic film 213 has been exemplified. However, the invention is not limited to this configuration. For example, as shown in FIG. 12, the incident position IP of the excitation light may be changed by rotating the dichroic film 213 (base material). In this case, the dichroic film 213 includes, in this order, regions E1, E2, E3, E4, and E5 having different reflectances along a direction in which the incident position IP of the excitation light on the dichroic film 213 moves, that is, along the rotational direction of the base material. For example, the reflectance of the region E1 is highest; the reflectance of the region E5 is lowest and the reflectances of the regions E2 to E4 are successively lowered.

Moreover, the microlens array is used as the diffusion section in the above embodiment, but the diffusion section is not limited to this. For example, a concavo-convex structure formed on a surface of the phosphor layer 11 on the dichroic film 13 side can be used as the diffusion section. Moreover, an intermediate layer is provided between the phosphor layer 11 and the dichroic film 13, and an irregular concavo-convex structure may be formed on a surface of the intermediate layer on the dichroic film 13 side.

In each of the above embodiments, an example in which the illumination device according to the invention is applied to the projector has been shown, but the invention is not limited to this. The illumination device according to the invention can be applied also to a luminaire such as a headlight for an automobile.

The entire disclosure of Japanese Patent Application No. 2016-001829, filed on Jan. 7, 2016 is expressly incorporated by reference herein.

What is claimed is:

1. A wavelength conversion element comprising:
    a base material including a light-reflecting surface;
    a dichroic film; and
    a wavelength conversion layer provided between the light-reflecting surface and the dichroic film,
    the dichroic film reflecting a part of light which has a wavelength within a predetermined wavelength band that the wavelength conversion layer absorbs and having a reflectance distribution that varies along a predetermined direction with respect to the light that has the wavelength.

2. The wavelength conversion element according to claim 1, wherein
    a change in the reflectance distribution is continuous.

3. The wavelength conversion element according to claim 1, wherein
    a change in the reflectance distribution is discontinuous.

4. The wavelength conversion element according to claim 1, wherein
    a thickness of the dichroic film has a distribution along the predetermined direction.

5. The wavelength conversion element according to claim 1, further comprising a diffusion section provided between the wavelength conversion layer and the dichroic film.

6. An illumination device for emitting illumination light, the illumination device comprising:
    the wavelength conversion element according to claim 1;
    a light-emitting element emitting excitation light in the wavelength band; and
    a drive device moving the base material,
    the dichroic film including a first region and a second region each having a different reflectance with respect to the excitation light,
    the drive device being configured to be able to move an incident position of the excitation light between the first region and the second region,
    the illumination light including a component of portion of the excitation light reflected by the dichroic film and fluorescence produced by the wavelength conversion layer.

7. An illumination device for emitting illumination light, the illumination device comprising:
    the wavelength conversion element according to claim 2;
    a light-emitting element emitting excitation light in the wavelength band; and
    a drive device moving the base material,
    the dichroic film including a first region and a second region each having a different reflectance with respect to the excitation light,
    the drive device being configured to be able to move an incident position of the excitation light between the first region and the second region,
    the illumination light including a component of portion of the excitation light reflected by the dichroic film and fluorescence produced by the wavelength conversion layer.

8. An illumination device for emitting illumination light, the illumination device comprising:
    the wavelength conversion element according to claim 3;

a light-emitting element emitting excitation light in the wavelength band; and a drive device moving the base material, the dichroic film including a first region and a second region each having a different reflectance with respect to the excitation light, the drive device being configured to be able to move an incident position of the excitation light between the first region and the second region, the illumination light including a component of portion of the excitation light reflected by the dichroic film and fluorescence produced by the wavelength conversion layer.

9. An illumination device for emitting illumination light, the illumination device comprising:

the wavelength conversion element according to claim 4;

a light-emitting element emitting excitation light in the wavelength band; and a drive device moving the base material, the dichroic film including a first region and a second region each having a different reflectance with respect to the excitation light, the drive device being configured to be able to move an incident position of the excitation light between the first region and the second region, the illumination light including a component of portion of the excitation light reflected by the dichroic film and fluorescence produced by the wavelength conversion layer.

10. An illumination device for emitting illumination light, the illumination device comprising:

the wavelength conversion element according to claim 5;

a light-emitting element emitting excitation light in the wavelength band; and a drive device moving the base material, the dichroic film including a first region and a second region each having a different reflectance with respect to the excitation light, the drive device being configured to be able to move an incident position of the excitation light between the first region and the second region, the illumination light including a component of portion of the excitation light reflected by the dichroic film and fluorescence produced by the wavelength conversion layer.

11. The illumination device according to claim 6, further comprising:

a detection section measuring a light amount of the illumination light; and a controller controlling the drive device based on a measurement result of the detection section.

12. The illumination device according to claim 6, further comprising a rotation device rotating the base material around a predetermined center of rotation, wherein the wavelength conversion layer and the dichroic film are provided around the center of rotation, and the predetermined direction is a radial direction of the base material.

13. A projector comprising:

the illumination device according to claim 6;

a light modulator modulating light from the illumination device in response to image information to thereby form image light; and a projection optical system projecting the image light.

14. A projector comprising:

the illumination device according to claim 11;

a light modulator modulating light from the illumination device in response to image information to thereby form image light; and a projection optical system projecting the image light.

15. A projector comprising:

the illumination device according to claim 12;

a light modulator modulating light from the illumination device in response to image information to thereby form image light; and a projection optical system projecting the image light.

* * * * *